United States Patent
Wacker et al.

(10) Patent No.: US 8,333,416 B2
(45) Date of Patent: Dec. 18, 2012

(54) IMPACT ELEMENT AND USE OF AN INSERT FOR A CARRIER OF AN IMPACT ELEMENT

(75) Inventors: Marco Wacker, Wilhermsdorf (DE); Joerg Russ, Altdorf (DE)

(73) Assignee: Jacob Plastics GmbH, Wilhermsdorf (DE)

( * ) Notice: Subject to any disclaimer, the term of this patent is extended or adjusted under 35 U.S.C. 154(b) by 228 days.

(21) Appl. No.: 12/730,610

(22) Filed: Mar. 24, 2010

(65) Prior Publication Data

US 2010/0244470 A1 Sep. 30, 2010

(30) Foreign Application Priority Data

Mar. 25, 2009 (DE) .................. 20 2009 004 158 U

(51) Int. Cl.
*B60R 19/03* (2006.01)
*B60R 19/24* (2006.01)

(52) U.S. Cl. .................. 293/120; 293/133; 293/155

(58) Field of Classification Search .................. 293/120, 293/121, 133, 155
See application file for complete search history.

(56) References Cited

U.S. PATENT DOCUMENTS 6,779,821 B2 * 8/2004 Hallergren .................. 293/133
2007/0257497 A1 * 11/2007 Heatherington et al. ..... 293/120

FOREIGN PATENT DOCUMENTS

| DE | 19907783 | | 8/2000 |
|---|---|---|---|
| DE | 20117723 | * | 1/2002 |
| DE | 10307637 | | 9/2004 |
| DE | 102004024468 | | 12/2005 |
| EP | 1787870 | | 5/2007 |
| WO | 03/042004 | | 5/2003 |
| WO | 2006/126941 | | 11/2006 |

* cited by examiner

*Primary Examiner* — Dennis Pedder
(74) *Attorney, Agent, or Firm* — Dilworth & Barrese, LLP.

(57) ABSTRACT

The present invention relates to an impact element having at least one carrier and at least one deformation element, wherein the carrier has a strip-shaped insert which is at least partly sheathed with plastic, wherein the strip-shaped insert is slit into at least two strips in at least one profile section and one strip is set back with respect to the other strip by shaping while forming a gap, with the deformation element being able to be fastened or being fastened to the carrier by means of at least one fastening means and the fastening means being guided through the gap between the strips of the insert, with at least one plastic molding being provided which is arranged such that it inhibits and/or prevents a relative movement between the fastening means or the deformation element and the insert.

17 Claims, 2 Drawing Sheets

IMPACT ELEMENT AND USE OF AN INSERT FOR A CARRIER OF AN IMPACT ELEMENT

BACKGROUND OF THE INVENTION

The present invention relates to an impact element having at least one carrier and at least one deformation element, with the carrier having a strip-shaped insert which is at least partly sheathed with plastic, and to the use of an insert for a carrier of an impact element.

Such impact elements are used, for example, in automotive engineering to reduce the impact energy in impact situations by plastic deformation. It is at the same desired that all components of a vehicle have a weight-optimized structure in order e.g. to reduce the fuel consumption of the vehicle. Safety requirements and weight demands can in this respect not always be easily reconciled with one another.

Furthermore, components of a vehicle are subject to enormous cost pressure. It would therefore be desirable to be able to produce impact elements and their components as simply and as cost-effectively as possible, and indeed without compromises in safety.

SUMMARY OF THE INVENTION

It is therefore the object of the present invention to further develop an impact element of the initially named kind in an advantageous manner, in particular such that it has a simple and weight-saving structure and can easily absorb impact energy.

This object is achieved in accordance with the invention by an impact element having the features herein. Provision is accordingly made that an impact element has at least one carrier and at least one deformation element, with the carrier having a strip-shaped insert which is at least partly sheathed with plastic. Provision is further made that the strip-shaped insert is slit into at least two strips in at least one profile section and one strip is set back with respect to the other strip by shaping, with the deformation element being able to be fastened or being fastened to the carrier by means of at least one fastening means and the fastening means being guided through the gap between the strips of the insert, with at least one plastic molding being provided which is arranged such that it inhibits and/or prevents a relative movement between the fastening means or the deformation element and the insert.

An impact element can thereby be formed particularly easily which has a high absorption capability for impact energy by the combination of the different material properties such as the Young's modulus or the yield point of the material of the insert as well as of the plastic. The bending strength of a steel metal sheet can, for example, be combined with the impact resistance of a plastic. The impact element can furthermore be set up in simple and few worksteps so that a cost-effective production is possible.

A deformation element can, for example, be a box-like structure which absorbs a large part of the impact energy by being pushed together on the impact. Provision can generally be made that the deformation element is also part of a space frame of a vehicle or part of the body superstructures of a vehicle. The plastic molding can, for example, be formed by a wall which extends at least partly between the strips of the insert or at least partly connects the strips.

The impact element in particular has the advantage that the fastening means of the deformation element first have to overcome the resistance of the plastic molding for a separation of the deformation element from the carrier, whereby e.g. a large part of the impact energy can already be absorbed.

It is preferred if the strip-shaped insert is not slit at the end side. It is particularly advantageous in this respect that the carrier has a structure which springs out of itself due to the shaping of the insert.

It is furthermore conceivable that the insert is slit into three strips in the profile section, with the middle strip being set back with respect to the other strips by shaping. It is conceivable in this respect, for example, that the insert is formed in a non-divided or non-slit manner in an end region and a transition region is formed between the profile section and the end region, with the middle strip being set back to the rear, preferably in edgelessly sweeping manner and extending parallel to the front outer strip set back to the rear in the profile section.

It is possible that a section substantially C-shaped in cross-section is formed between the strips by the connection of the gaps by the plastic molding.

It is furthermore conceivable that at least one deformation element can be fastened or is fastened to the set back strip.

Provision can moreover be made that the fastening means for the deformation element is a screw or a bolt and/or in that the fastening means engages around the set back strip and/or does not pass through the material of the insert. The particular advantage thereby results, for example, that the linkage between the carrier and the deformation element can only take place by e.g. tearing open the middle strip of the insert. However, before the tearing open of the strip, the path of a region filled with plastic and settable and predefinable by the spacing of the deformation element from a transition region of the insert must first, however, be deformed. It is conceivable that the resistance of a wall formed by plastic and, for example, closing the gap between the strips can first be overcome and plastically deformed. A very large part of possible impact energy is thereby already absorbed. A tearing open of the strip is thereby made more difficult as much as possible.

It is furthermore conceivable that a separate profile section is in each case provided for the fastening of a deformation element.

It is also possible that a common profile section is provided for the fastening of a plurality of deformation elements.

It is furthermore of advantage if the profile section is reinforced by one or more ribs, in particular plastic ribs. The carrier can thereby be stabilized in a simple manner.

Provision can be made that the transition region between the profile section and the non-slit end region of the insert is reinforced by at least one rib.

If is preferred if a plurality of ribs are arranged at least partly peripherally and/or at the rear at and/or around the profile section and/or transition region. An impact at the front side can hereby be effectively countered. The ribs are preferably evenly spaced apart along the upper part of the profile section.

Provision can furthermore be made in an advantageous embodiment that the carrier is curved, is preferably curved overall or towards the rear at the respective end side. The spring or cushioning properties can thereby be advantageously amplified.

It is moreover advantageously conceivable that the plastic is a fiber-reinforced plastic and/or that the strip-shaped insert is an ultra-strong steel metal sheet.

The invention furthermore relates to the use of an insert for a carrier of an impact element in accordance with the description herein. Provision is made in this respect that the strip-shaped insert is slit into at least two strips in at least one profile section and one strip is set back with respect to the other strip by shaping while forming a gap. It is preferred if the strip-shaped insert is non-slit at the end side at both sides and/or if the insert in slit into three strips in the profile section, with the middle strip being set back with respect to the other strips by shaping.

The invention furthermore relates to a motor vehicle having the features herein. Provision is accordingly made that a motor vehicle has at least one impact element having the features herein.

BRIEF DESCRIPTION OF THE DRAWINGS

Further details and advantages should be described in more detail in the following with reference to an embodiment shown in the drawing. There are shown.

DESCRIPTION OF THE PREFERRED EMBODIMENTS

Figure 1:
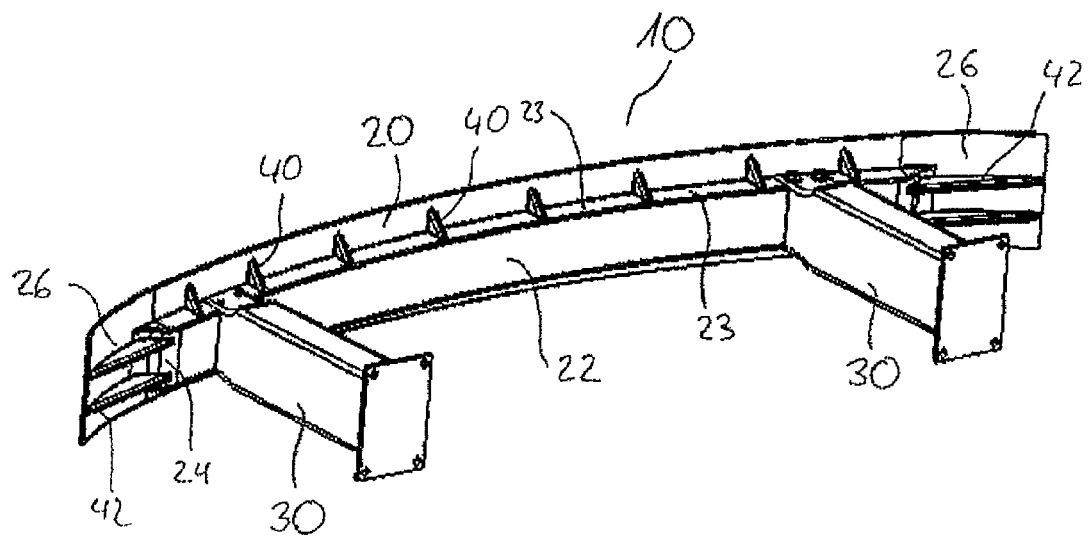
FIG. 1: a perspective view of the rear side of an impact element.
Figure 2:
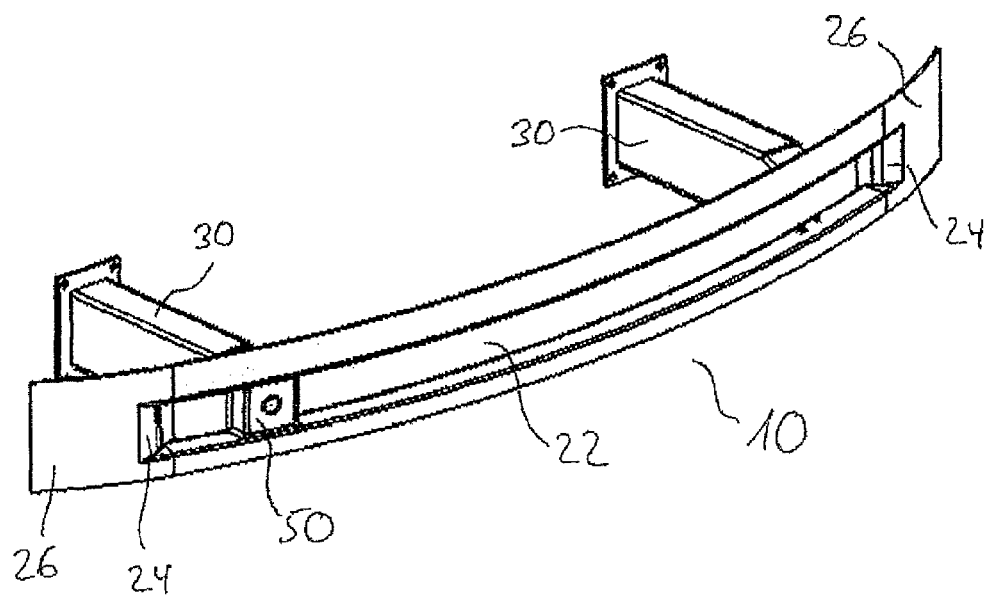
FIG. 2: a perspective view of the front side of an impact element.

FIGS. 1 and 2 show a perspective view of the front side and rear side of an impact element 10. In this respect, the impact element 10 substantially has three components, specifically a plastic-sheathed carrier 20 as well as two deformation elements 30 by means of which the impact element 10 can, for example, be fastened to a vehicle.

Fiber-reinforced plastic can, for example, be used as the plastic to completely sheath the carrier 20. The deformation elements 30 can also be made of fiber-reinforced plastic.

The carrier 20 substantially has three regions 22, 24, 26. The region 22 is a profile section 22 which is made in C shape and in which a carrier wall has been set back rearwardly. The C shape is substantially formed by the sheathed, set back strip 62 of the insert 60 as well as by the plastic moldings 23 which are designed as walls 23 and which connect the strips 64 to the set back strip 62.

Figure 3:
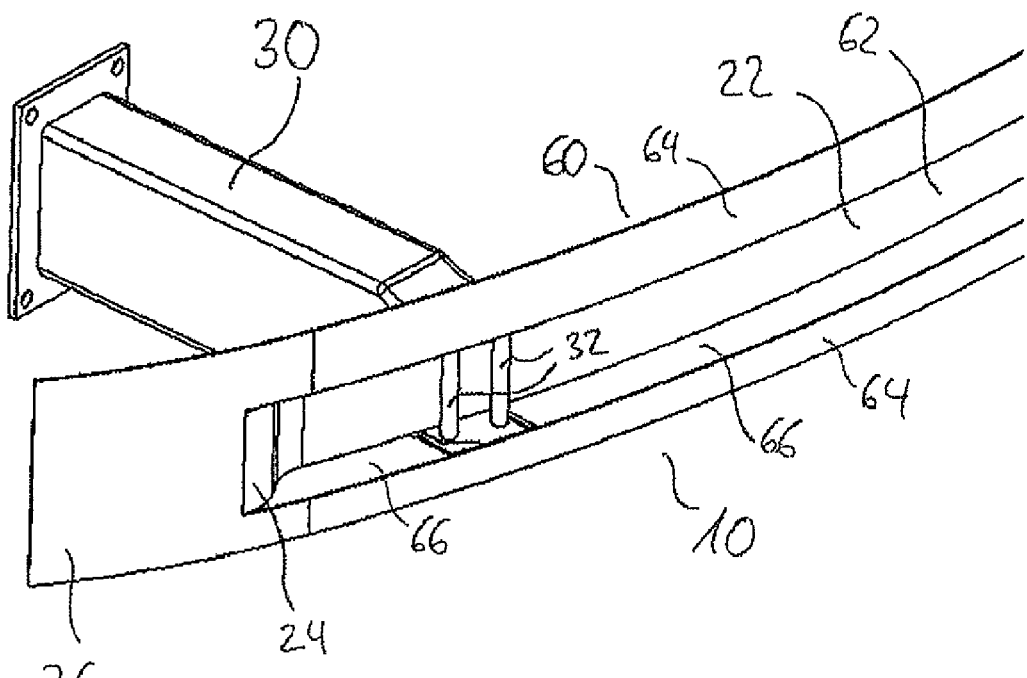
FIG. 3: a perspective part view of the front side of the impact element without a plastic sheath.
Figure 4:
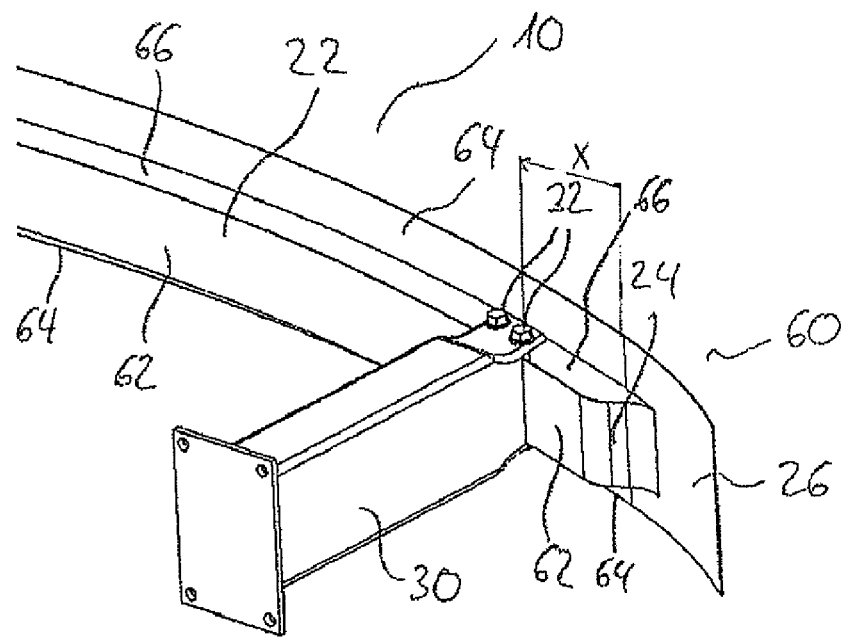
FIG. 4: a perspective part view of the rear side of the impact element without a plastic sheath.

As shown in FIGS. 3 and 4, the profile section 22 is formed in that an insert 60 made of ultra-strong steel metal sheeting has a double slit and the middle strip 62 is set back with respect to the two outer strips 64 by shaping. The strips 62, 64 in this respect extend substantially in parallel over the total carrier length. At the start and end of the slit, a transition region 24 is formed in which the profile section 22 merges in an edgelessly swept manner into the respective non-slit end region 26.

It is generally conceivable that a non-slit middle region, not illustrated in any more detail, is formed, with a profile section 22 likewise merging in an edgelessly swept manner into this middle region of the carrier 20.

Two gaps 66 are formed between the strips 62, 64. These gaps 66 are closed to form a plastic wall 23 on the sheathing with plastic. In the embodiment shown here, the lower strip 64 of the insert 60 has a smaller form in the profile section 22 than the upper strip 64 of the insert 60.

A deformation element 30, which is formed as a rectangular tubular piece 30, is fastened in a clamping manner to the strips 62 set back rearwardly by means of screws 32 before the sheathing. The screws 32 or corresponding bores are shaped into the wall 23 on the forming of the wall 23 and engage around the strip 62 of the insert 60.

As shown in FIG. 1, the walls 23 are reinforced by means of ribs 40 applied to the rear side of the carrier 20. Furthermore, two ribs 42 are provided in each case which reinforce the transition region 24 and extend from the end region 26 parallel toward the longitudinal direction of the carrier to the transition region. The ribs 40 and 42 stand perpendicular on the carrier surface in this respect.

It is furthermore possible that the deformation element 30 and/or the screws 32 is/are blocked and/or stabilized by plastic elements 50 at the front side.

The manufacturing process of the impact element can be explained in an illustrative manner with reference to FIGS. 3 and 4. The insert 60 made of ultra-strong steel is slit twice, e.g. by punching, so that three strips 62, 64 are formed which are connected in the end region. The middle strip 62 is set back parallel to the front strips 64 by a suitable shaping process, e.g. by cold shaping or hot shaping. Two gaps 66 are thus formed. At the same time, the whole insert 60 can be curved during the shaping. The slitting and shaping can generally also take place in one workstep.

A deformation element 30 can now be fastened in a clamping manner by means of screws 32 to the rearward strip.

The insert 60 is put into a mold in a further step and is completely sheathed for the sheathing with fiber-reinforced plastic. The ribs 40, 42 are also formed in this process at the same time. The insert 60 and the fiber-reinforced plastic are pressed with one another in a press mold. It is conceivable in this respect also to combine the sheathing and shaping of the insert 60 in one work process.

The sheathing can, however, also take place, for example, by an injection molding process. It is, however, likewise conceivable that a plurality of layers of laminate are applied to the insert 60 and are adhesively bonded or press bonded.

It is particularly advantageous that the linkage between the carrier 20 and the deformation element 30 can only take place by tearing open the steel strip 62. However, before the tearing open of the steel strip 62, the path of the plastic filling 23 or of the wall 23 (cf. path X in FIG. 4) settable and predefinable by the spacing of the deformation element 30 from the transition region 24 first has to be overcome and plastically deformed, whereby a very large part of possible impact energy is already absorbed. A tearing open of the steel strip 62 is thereby made more difficult as much as possible.

It is conceivable only to provide the profile section 22 or the set back strip 62 where the deformation elements 30 or the fastening elements 32 are located. Alternatively to this, the set back strip 62 can also extend over the total length between the deformation elements 30.

The plastic molding 23 can be, but does not have to be, arranged in the gap 66. Alternatively or additionally, the plastic molding 23 can extend, for example, in the region between the deformation elements 30 or the fastening elements 32 and the adjacent regions, in particular up to the transition regions 24.

The path is marked by the reference symbol "X" in FIG. 4 which is at least partly filled with plastic and which performs the deformation work before a tearing open of the steel metal sheet occurs. The path X can be set or adjusted, whereby the deformation work or the energy absorbed by the plastic can be changed accordingly.

The invention claimed is:

1. An impact element (10) having at least one carrier (20) and at least one deformation element (30), wherein
the carrier (20) has a strip-shaped insert (60) which is at least partly sheathed
with plastic, the strip-shaped insert (60) comprises a profile section (22) in turn having at least two strips (62, 64) with one strip (62) set back with respect to the other strip (64) to define a gap (66) between said two strips (62, 64), the deformation element (30) is fastened to the carrier (20) by at least one fastening means (32) guided through the gap (66) between the strips (62, 64) of the insert (60), and the gap (66) between said two strips (62, 64) is closed by the plastic sheathing of the carrier (20) to form a wall (23) shaped around the fastening means (32) such that relative movement between the fastening means (32) and the insert (60) is inhibited or prevented.

2. An impact element (10) in accordance with claim 1, wherein the profile section (22) of the insert (60) has three strips (62, 64), with the middle strip (62) being set back with respect to the other strips (64).

3. An impact element (10) in accordance with claim 1, wherein at least one deformation element (30) is fastened to the strip (62) which is set back with respect to the other strip (64).

4. An impact element (10) in accordance with claim 1, wherein the fastening means (32) for the deformation element (30) is a screw (32) or a bolt (32).

5. An impact element (10) in accordance with claim 1, wherein the strip-shaped metal insert (60) comprises a separate profile section (22) for the fastening of each deformation element (30).

6. An impact element (10) in accordance with claim 1, wherein a common profile section (22) is provided for the fastening of a plurality of deformation elements (30).

7. An impact element (10) in accordance with claim 1, wherein the profile section (22) is reinforced by one or more rib(s) (40, 42).

8. An impact element (10) in accordance with claim 7, wherein a plurality of ribs (40) are arranged rearwardly around the profile section (22).

9. An impact element (10) in accordance with claim 1, wherein the carrier (20) is curved.

10. An impact element (10) in accordance with claim 1, wherein the plastic is a fiber-reinforced plastic.

11. An impact element (10) in accordance with claim 1, wherein the fastening means (32) engages around the strip (62) which is set back with respect to the other strip (64).

12. An impact element (10) in accordance with claim 7, wherein the profile section (22) is reinforced by one or more plastic rib(s) (40, 42).

13. An impact element (10) in accordance with claim 1, wherein the strip-shaped insert (60) is a steel metal sheet.

14. An impact element (10) in accordance with claim 2, wherein the strips (62, 64) extend substantially in parallel over total length of the carrier (20) and the profile section (22) comprises transition regions (24) at opposite ends thereof arranged to smoothly and edgelessly merge with the other strips (64) such that opposite ends of the carrier (20) have flat or nonprofiled regions (26).

15. An impact element (10) in accordance with claim 1, additionally comprising plastic elements (50) situated in the gap (66) of said profile section (22) and arranged adjacent said fastening means (32) to block or stabilize the deformation element(s) (30).

16. An impact element (10) in accordance with claim 2, wherein the middle strip (62) that is set back, extends over total length between all deformation elements (30).

17. An impact element (10) in accordance with claim 1, wherein the deformation element (30) is fastened to the carrier (20) on a side of the wall (23) opposite the gap (66).

* * * * *